July 11, 1944.  A. P. FERGUESON  2,353,553
FENDER SHIELD
Filed Aug. 8, 1941  2 Sheets-Sheet 1
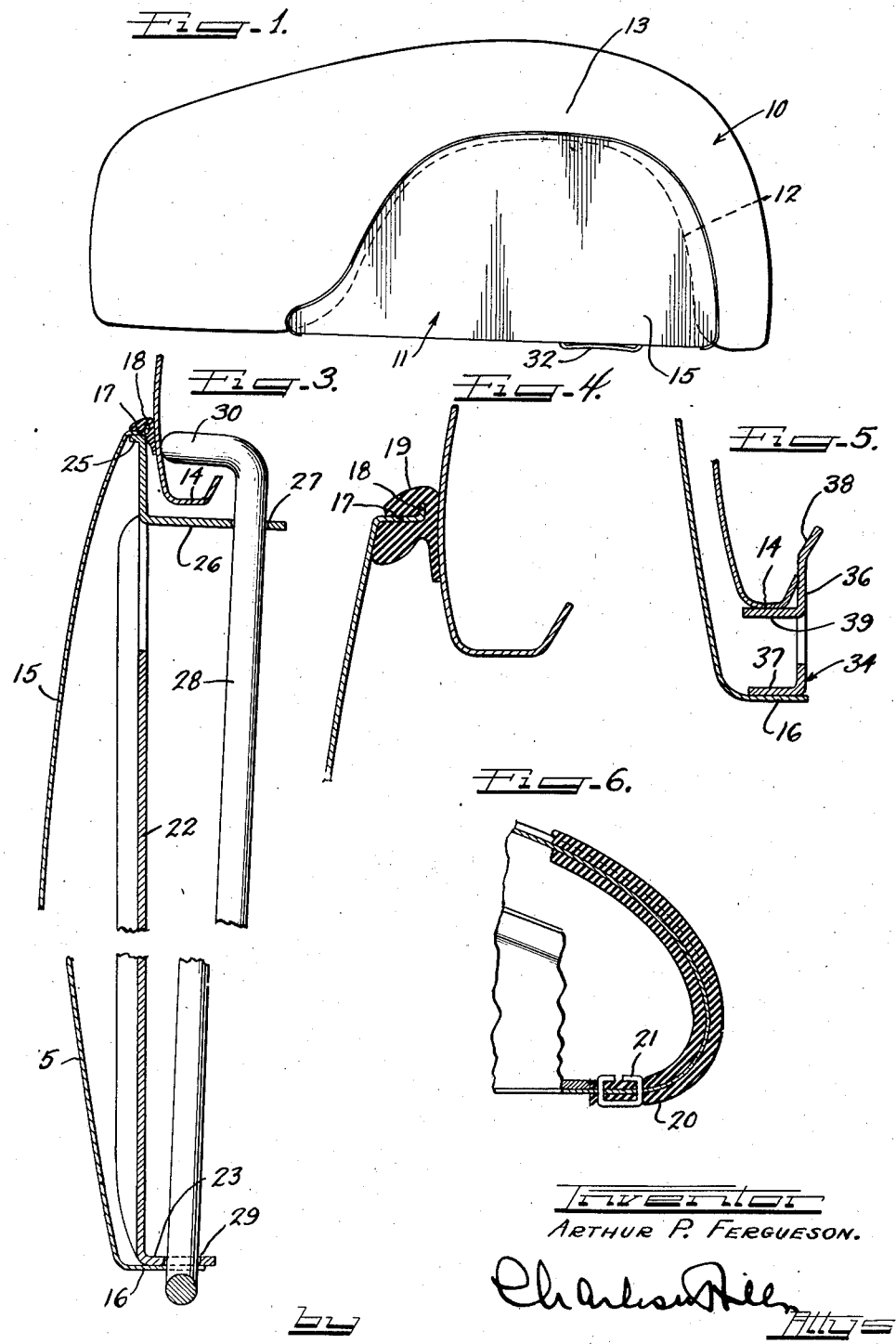
Inventor
ARTHUR P. FERGUESON.

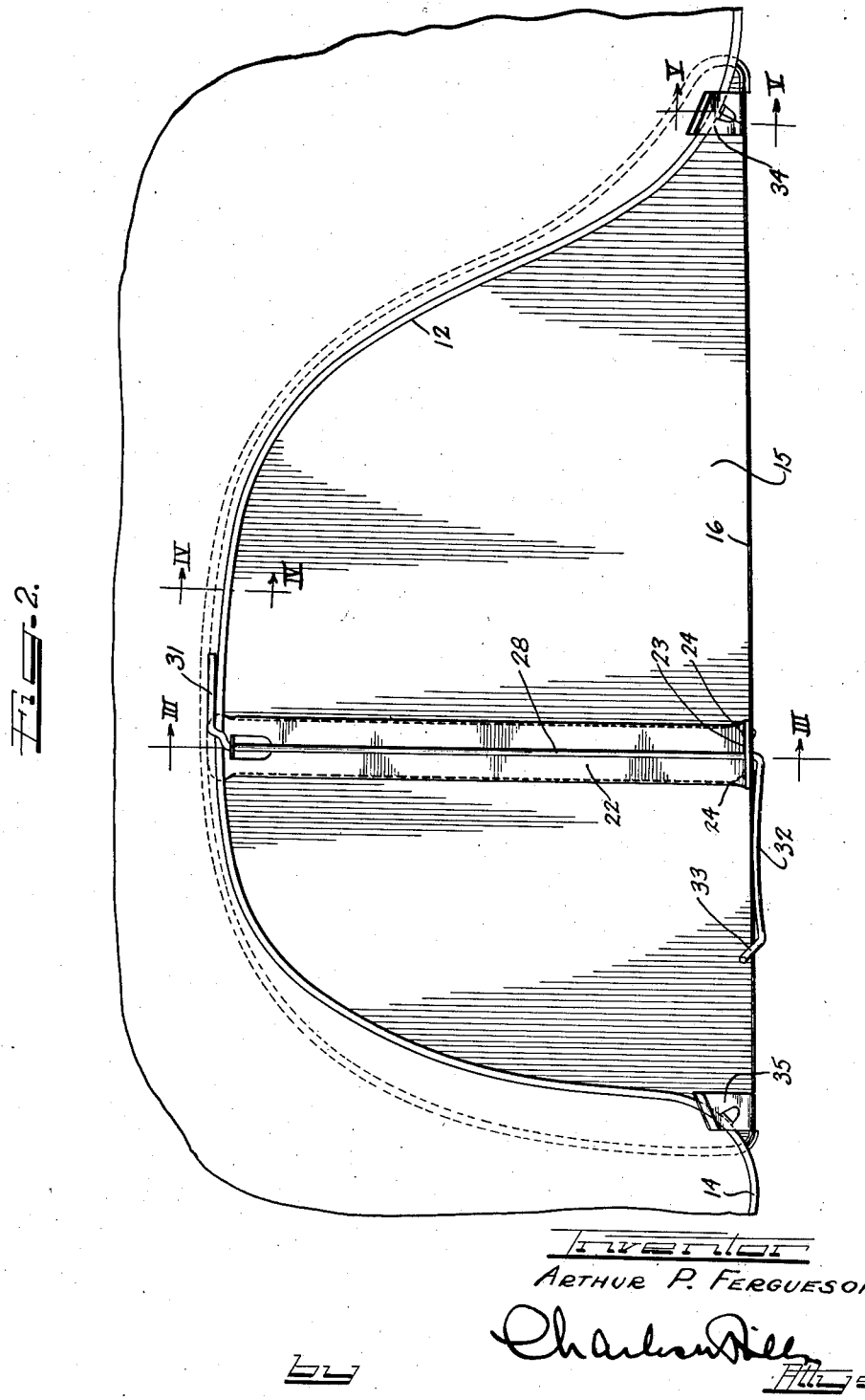

Patented July 11, 1944

2,353,553

UNITED STATES PATENT OFFICE 2,353,553

FENDER SHIELD

Arthur P. Fergueson, Detroit, Mich., assignor to Houdaille-Hershey Corporation, Detroit, Mich., a corporation of Michigan Application August 8, 1941, Serial No. 405,922

2 Claims. (Cl. 280—153)

This invention relates to fender and fender shield constructions, and more particularly to a novel method and means for mounting and securing fender shields to a vehicle fender, and to novel clamping and latching mechanisms therefor.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a novel combination fender and fender shield construction in which the fender shield is secured to the fender in a novel manner.

It is a further object of this invention to provide a novel fender shield construction which is economical to manufacture, which is rugged and reliable in use, and in which the fender shield may be readily and quickly attached to and detached from the vehicle fender.

Another object of the present invention is to provide a fender shield having a novel clamping means thereon.

A still further object of the present invention is to provide a fender shield having a novel reinforcing member thereon.

Another and further object of this invention is to provide a novel method and means for detachably securing a fender shield to a vehicle fender.

The novel features which I believe to be characteristic of my invention are set forth with particularity in the appended claims. My invention itself, however, both as to its organization, manner of construction, and method of operation, together with further objects and advantages thereof, may best be understood by reference to the accompanying drawings, in which:

Figure 1 is a front elevational view of a vehicle fender and fender shield assembly;

Figure 2 is an enlarged rear elevational view of the fender and fender shield assembly shown in Figure 1;

Figure 3 is an enlarged sectional view taken along the line III—III of Figure 2;

Figure 4 is a vertical sectional view of a portion of the assembly as taken along the line IV—IV of Figure 2;

Figure 5 is an irregular sectional view of the portion of the assembly as taken along the line V—V of Figure 2; and, Figure 6 is a fragmentary sectional view taken in a vertical plane parallel to the plane of the fender opening showing the trailing edge of the fender shield and the manner in which the rubber cushioning strip is secured thereto.

Referring now to the various figures of the drawings, which illustrate one embodiment of the present invention, there is illustrated therein a vehicle fender 10 having a fender shield 11 mounted thereon over the wheel access opening 12 in the outer depending side wall 13 of the fender 10. While the fender 10 may assume a wide variety of shapes without departing from the spirit and scope of the present invention, and may indeed, be formed integral and made a part of the body itself (not shown), the fender 10 has been illustrated as being of a high crowned type. The fender shield 11 is detachably mounted on the vehicle fender 10 and is positioned to cover the relatively large opening 12 in the outer side wall 13 of the fender 10, which is conventionally provided in substantially all vehicle fenders to permit access to and removal of the vehicle wheel therethrough.

The fender 10 is provided with a bent back flange 14 which is in the form of an open fold and which extends not only along the base edges of the fender 10 but also around the opening 12.

The fender shield 11 comprises a panel portion 15 which is large enough to extend over the entire opening 12 as well as to overlap the marginal portion of the fender 10 around the opening 12.

The lower edge of the panel portion 15 merges into an inwardly extending base flange portion 16. The remaining edge portion of the panel 15 merges into an inturned peripheral flange 17 which extends around the entire end and top portion of the fender shield 11. The inner extremity of the flange portion 17 is turned out at right angles to the main body portion of the flange 17 in a lip portion 18.

In order to prevent a direct metal-to-metal contact between the fender shield 11 around its marginal portion where it is seated on the fender 10, a rubber cushioning bead or other suitable strip of yieldable material 19 is provided. While the cross-sectional configuration of this cushioning strip 19 may vary a great deal, the form shown in Figure 4 of the drawings has been particularly suitable for a fender shield of the type herein described. This rubber cushioning strip 19 may be bonded or otherwise suitably secured to the flange 17. The lip 18 of the flange 17 greatly assists in preventing the cushioning strip 19 from becoming dislodged. In order to further assist in securing the cushioning strip to the flange 17, the lower ends 20 thereof are clipped to the flange 17 by a wire staple 21, or the like (see Figure 6).

The panel 15 of the fender shield 11 is reinforced and stiffened by a vertically extending strut 22 which is channel shaped in cross section. The lower end of the strut 22 is provided with a foot or base portion 23 which is riveted or otherwise suitably secured to the base flange 16 of the fender shield 11 as at 24. The upper end of the strut 22 is turned outwardly as at 25 and seated against the under side of the flange 17. The portion 25 of the strut 22 is spot welded or otherwise suitably secured to the flange 17. For a reason which will presently appear, a tongue 26 is struck out of the upper portion of the web of the strut 22, and the inner end of this tongue 26 is apertured as at 27.

A torsion rod or clamping member 28 is mounted on the rear of the fender shield 11 and this rod 28 extends up through the aperture 27 in the tongue 26. The rod 28 also extends down through an aperture 29 which is cut through the foot 23 in the base flange 16. The upper end of the torsion rod 28 is bent forwardly as at 30 (Figure 3) and terminates in a long finger portion 31 (Figure 2) which is arranged to lie against the inner face of the depending side wall 13 of the fender 10. As is clearly shown in Figure 3, the portion 30 of the torsion rod 28 is arranged to be spaced above the folded marginal flange 14 of the fender 10.

The lower end of the torsion rod 28 is bent to extend along below the base flange 16 of the fender shield 11 as at 32 and terminates in an angularly upturned portion 33 which is arranged to be snapped up behind the rear edge of the base flange 16 of the fender shield 11.

As is clearly apparent from an inspection of Figure 2, the torsion rod which is made of a stiff resilient material is arranged to have the end 33 sprung down below the base flange 16 and you then have the tail portion 32 and the tip 33 rotated out from under the base flange 16 on the outer side of the fender. This rotational movement of the central vertical portion of the torsion rod 28 moves the top finger portion 31 away from the inner face of the depending side wall 13 of the fender 10.

When the torsion rod is moved in the opposite direction the top finger portion 31 bears against the inner face of the outer depending side wall 13 of the fender 10 and the lower tip portion 33 is sprung up behind the base flange 16 of the fender shield 11. The angular relationship of the finger 31 and the lower portion 32 when viewed horizontally is such that in order to move the tip portion 33 up behind the base flange 16 considerable torsional stress is set up in the rod 28 by the bearing of the finger 31 against the inner face of the wall 13. This causes such a tight grip to be applied that the fender shield 11 is held snugly in place on the fender 10 and vertical support therefor is provided by frictional engagement only.

As will be apparent from the foregoing description, the tongue 26 which is struck out from the web of the strut 22 provides a convenient and inexpensive guide bracket for the torsion rod 28.

In order to align the base edge of the fender shield 11 with the base edges of the fender, two aligning brackets 34 and 35 are provided in the two lower corners of the fender shield 11. Since the aligning bracket 35 is similar in construction to the aligning bracket 34, only the latter will be described in detail.

Referring now specifically to Figures 2 and 5 of the drawings, the aligning bracket 34 includes a body portion 36 which has a foot or base portion 37 seated thereon and spot welded or otherwise suitably secured to the base flange 16 of the fender shield 11. The upper end of the body portion 36 of the bracket 34 is flared inwardly at a slight angle as at 38 to provide a cam surface for pulling the lower corners of the fender shield 11 tightly into position against the fender 10. A tongue 39 is struck out from the body portion 36 of the bracket 34, the line of bend being at an angle, as is clearly illustrated in Figure 2. This struck out portion or tongue 39 is arranged to be seated against the folded flange portion 14 of the fender 10 substantially at the lower corner of the opening 12. As will be apparent from an inspection of Figure 5, the bracket 34 not only serves as an aligning means for limiting the upward movement of the fender shield 11 with respect to the fender 10, but also serves as a retaining clamp for holding the lower corner of the fender shield tightly against the fender 10.

As has previously been pointed out, the bracket 35 is similar in construction to the bracket 34, with the exception that the tongue is bent to fit the particular curvature of the fender at that point.

To mount the fender shield 11 on the fender 10, the lower portion 33 of the torsion rod 28 is sprung down below the base edge 16 of the fender shield 11 and the torsion rod rotated to a position in which the top finger portion 31 extends at an angle to the plane of the channel portion 15. The fender shield is now held in a position opposite the opening 12 in the fender 10 and then manually pulled up until the brackets 34 and 35 have been cammed into tight engagement with the folded flange portion 14 of the fender 10 and until their respective tongues 39 have been seated thereon. The torsion rod 28 is then rotated to force the finger 31 into tight engagement with the under side of the outer depending wall 13 and until the lower end 33 has been snapped up behind the base flange 16 of the fender shield 11.

To remove the fender shield 11 from the fender 10 the operations above described are carried out in a reverse order.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A fender shield for covering the wheel opening in the outer depending side wall of a vehicle fender having attaching means thereon comprising a resilient latch member having a substantially vertically extending intermediate portion, which intermediate portion is torsionally stressed about its longitudinal axis, and two end portions extending in substantially opposite directions in substantially a horizontal plane, one of said end portions being bent and stressed to lie flat along the inner face of the outer depending side wall of said fender, and a strut member on the rear of said fender shield extending between the top and bottom edges and having a tongue struck out of an intermediate portion thereof, said resilient latch member passing through said aperture in said tongue, whereby said tongue acts as a guide bearing for the intermediate portion of said resilient latch member.

2. A fender shield having a reinforcing member of channel shape cross-section secured across the back thereof, said reinforcing member having a tongue struck out from the web portion thereof, said tongue being apertured for the reception of an axially rotatable clamping member, and an axially rotatable clamping member extending through the aperture in said tongue.

ARTHUR P. FERGUESON.